United States Patent
Bottari et al.

(10) Patent No.: US 11,363,674 B2
(45) Date of Patent: Jun. 14, 2022

(54) PROCESSING DELAY TOLERANT COMMUNICATIONS

(71) Applicant: Telefonaktiebolaget LM Ericsson (publ), Stockholm (SE)

(72) Inventors: Giulio Bottari, Pisa (IT); Fabio Cavaliere, Pisa (IT); Filippo Ponzini, Pisa (IT)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 0 days.

(21) Appl. No.: 16/768,954

(22) PCT Filed: Dec. 12, 2017

(86) PCT No.: PCT/EP2017/082466
§ 371 (c)(1),
(2) Date: Jun. 2, 2020

(87) PCT Pub. No.: WO2019/114937
PCT Pub. Date: Jun. 20, 2019

(65) Prior Publication Data
US 2021/0219381 A1    Jul. 15, 2021

(51) Int. Cl.
*H04W 4/00* (2018.01)
*G06F 7/00* (2006.01)
*H04W 84/04* (2009.01)
*H04W 4/70* (2018.01)
*H04W 28/02* (2009.01)

(52) U.S. Cl.
CPC .......... *H04W 84/042* (2013.01); *H04W 4/70* (2018.02); *H04W 28/0268* (2013.01)

(58) Field of Classification Search
CPC .. H04W 84/042; H04W 4/70; H04W 28/0268
USPC .......................................................... 370/329
See application file for complete search history.

(56) References Cited

U.S. PATENT DOCUMENTS

| | | | | |
|---|---|---|---|---|
| 5,889,972 A | * | 3/1999 | Allingham | .......... G06F 13/4036 710/311 |
| 5,995,488 A | * | 11/1999 | Kalkunte | ............ H04L 12/4013 370/232 |
| 7,246,171 B1 | * | 7/2007 | Ambrose | ................ H04L 67/06 370/468 |

(Continued)

FOREIGN PATENT DOCUMENTS

| | | |
|---|---|---|
| EP | 3 026 963 A1 | 6/2016 |
| EP | 3 157 208 A1 | 4/2017 |

OTHER PUBLICATIONS

NB-IOT Technology Overviewand Experience From Cloud-Ran Implementation, IoT: Protocol Stack, Cross-Layer, and Power Consumption Issues by Yihenew Dagne Beyene et al., IEEE Wireless Communications—Jun. 2017.

(Continued)

*Primary Examiner* — Mark G. Pannell
(74) *Attorney, Agent, or Firm* — Baker Botts, LLP (57) ABSTRACT

Methods and apparatus are provided for processing communications. In one aspect, a method comprises receiving first data from a first device and receiving second data from a second device, wherein the first data has a longer latency constraint than the second data. The method also comprises sending the first data over a network link to a processing node for processing the first data.

18 Claims, 7 Drawing Sheets

(56) References Cited

U.S. PATENT DOCUMENTS

| | | | | |
|---|---|---|---|---|
| 7,313,635 | B1* | 12/2007 | Zavalkovsky | H04L 12/66 370/352 |
| 8,842,724 | B1* | 9/2014 | Joung | H03M 7/04 375/240 |
| 9,059,970 | B1* | 6/2015 | Joung | H03M 7/30 |
| 2008/0056225 | A1* | 3/2008 | Brok | H04L 67/32 370/342 |
| 2011/0300858 | A1* | 12/2011 | Lee | H04W 28/0278 455/425 |
| 2013/0121249 | A1* | 5/2013 | Ji | H04W 4/06 370/328 |
| 2013/0163520 | A1 | 6/2013 | Kimura | |
| 2013/0163524 | A1* | 6/2013 | Shatzkamer | H04L 69/22 370/329 |
| 2013/0182632 | A1* | 7/2013 | Maeda | H04W 4/70 370/312 |
| 2013/0250772 | A1* | 9/2013 | Yin | H04L 5/16 370/241 |
| 2014/0219187 | A1* | 8/2014 | Webb | H04L 7/041 370/329 |
| 2015/0223060 | A1* | 8/2015 | Chiang | H04W 12/02 380/247 |
| 2015/0244395 | A1* | 8/2015 | Amezawa | H03M 7/30 341/51 |
| 2016/0255532 | A1* | 9/2016 | Huang | H04W 4/38 370/235 |
| 2017/0118578 | A1* | 4/2017 | Hoffmann | H04W 72/042 |
| 2017/0132853 | A1* | 5/2017 | Matos | H04W 48/20 |
| 2017/0208591 | A1 | 7/2017 | Rico Alvarino et al. | |
| 2017/0238335 | A1* | 8/2017 | Checko | H04L 43/106 370/329 |
| 2017/0238361 | A1* | 8/2017 | Pawar | H03M 7/40 455/561 |
| 2018/0227148 | A1* | 8/2018 | Chatterjee | H04L 5/005 |
| 2018/0249346 | A1* | 8/2018 | Plestid | H04W 16/24 |

OTHER PUBLICATIONS

A Survey on LPWA Technology; LoRa and NB-IoT by Rashmi Sharan Sinha et al.; The Koran Institute of Communications and Information Sciences, Division of Electronics and Electrical Engineering, Dongguk University—Seoul, Republic of Korea; Received Jan. 4, 2017; accepted Mar. 14, 2017-Mar. 27, 2017.

PCT Notification of Transmittal of the International Serach Report and the Written Opinion of the International Searching Authority, or the Declaration issued for International application No. PCT/EP2017/082466—Mar. 22, 2018.

* cited by examiner

PROCESSING DELAY TOLERANT COMMUNICATIONS

PRIORITY

This nonprovisional application is a U.S. National Stage Filing under 35 U.S.C. § 371 of International Patent Application Serial No. PCT/EP2017/082466 filed Dec. 12, 2017 and entitled "Processing Delay Tolerant Communications" which is hereby incorporated by reference in its entirety.

TECHNICAL FIELD

Examples of the present disclosure relate to methods and apparatus, for example for processing delay tolerant communications or data.

BACKGROUND

It is expected that there will be a large increase in the number of devices that are able to communicate over the internet. Such devices are expected to for what is called the "Internet of Things" (IoT), or are expected to communicate using technologies such as Machine Type Communication (MTC) or Narrowband Internet of Things (NB-IoT).

Some devices may have the capability to communicate over cellular networks. Accordingly, communication according to NB-IoT has been included in LTE Release 13 specifications.

NB-IoT operates using a small bandwidth and is typically delay tolerant. That is, the delay between transmission of data and processing the data can be large compared to other traffic, such as for example from User Equipment (UEs). NB-IoT traffic is defined by the following key features supported by the standard:

1. Small data transmission: NB-IoT technology is suitable for use with devices that transmit small amounts of data and can thus ensure minimal network impact (e.g., signaling overhead, network resources).
2. Infrequent transmission: devices typically transmit with long periods between two subsequent data transmissions.
3. Delay tolerance: a feature suitable for devices that can defer their data transfer. The purpose of this functionality is to allow the network operator to prevent devices that are delay tolerant from accessing the network in some cases (e.g., in case of radio access network overload).
4. Low mobility: optimized support for devices that do not move, move infrequently, or move only within a certain area. This feature enables the network operator to simplify and reduce the frequency of mobility management procedures.

It is desired that such devices can communicate effectively with a radio access network.

SUMMARY

One aspect of the present disclosure provides a method comprising receiving first data from a first device, the first data having a first type, wherein the first type is Internet-of-Things (IoT)-type, and receiving second data from a second device, the second data having a second type, wherein the first data has a longer latency constraint than the second data. The method also comprises sending the first data over a network link to a processing node for baseband processing the first data, and baseband processing the second data in a different node to the first data.

Optionally, sending the first data comprises buffering a plurality of data transmissions from the first device, and sending the plurality of data transmissions using a transport resource on the network link. Optionally, sending the plurality of data transmissions comprises sending the plurality of data transmissions when a total size of the plurality of data transmissions in a buffer exceeds a threshold proportion of a bandwidth of the transport resource.

Optionally, sending the first data over a network link to a processing node for baseband processing the first data comprises sending the first data to a first Cloud Radio Access Network (CRAN) for baseband processing the first data, and baseband processing the second data comprises baseband processing the second data in a second Cloud Radio Access Network (CRAN).

Optionally, sending the first data comprises sending the first data when a difference between an expiry time of at least some of the first data and a current time is less than a delay time for transmissions over the network link plus a tolerance time. Optionally, sending the first data comprises sending portions of the first data with an earliest expiry time first.

Optionally, the first type is a narrowband radio access technology type.

Optionally, the network link comprises a Common Public Radio Interface (CPRI).

Optionally, the first data comprises Machine Type Communication (MTC) data, Massive Machine Type Communication (MMTC) data, Internet of Things (IoT) data and/or Narrowband Internet of Things (NB-IoT) data, EC-GSM-IoT data and/or eMTC data.

Optionally, the second data comprises mobile telecommunications data or delay sensitive data.

Optionally, the method further comprises processing the second data at the network node.

Optionally, the method further comprises receiving third data from a third device, wherein the third data has a longer latency constraint than the second data, and sending the third data over a network link to a processing node for processing the third data. Optionally, the first data is received from a first Radio Equipment (RE), and the third data is received from a second RE.

Optionally, the first data and the second data are received from at least one Radio Equipment (RE). Optionally, the first data and the second data comprises IQ samples of transmissions from the first and second devices. Optionally, the first data and the second data are received over a Common Public Radio Interface (CPRI).

Optionally, the method further comprises identifying the first data from scheduling information for transmissions from the first device.

Optionally, the network node comprises a Radio Equipment Controller (REC).

Another aspect of the present disclosure provides apparatus in a network. The apparatus comprises a processor and a memory. The memory contains instructions executable by the processor such that the apparatus is operable to receive first data from a first device, the first data having a first type, wherein the first type is Internet-of-Things (IoT)-type, receive second data from a second device, the second data having a second type, wherein the first data has a longer latency constraint than the second data, send the first data over a network link to a processing node for baseband processing the first data, and baseband process the second data or send the second data to a different node than the first data for baseband processing.

A further aspect of the present disclosure provides apparatus that is configured to receive first data from a first device, the first data having a first type, wherein the first type is Internet-of-Things (IoT)-type, receive second data from a second device, the second data having a second type, wherein the first data has a longer latency constraint than the second data, and send the first data over a network link to a processing node for baseband processing the first data in a different node to the second data.

A still further aspect of the present disclosure provides apparatus that comprises a first receiving module configured to receive first data from a first device, the first data having a first type, wherein the first type is Internet-of-Things (IoT)-type, a second receiving module configured to receive second data from a second device, the second data having a second type, wherein the first data has a longer latency constraint than the second data, and a sending module configured to send the first data over a network link to a processing node for baseband processing the first data in a different node to the second data.

BRIEF DESCRIPTION OF THE DRAWINGS

For a better understanding of examples of the present disclosure, and to show more clearly how the examples may be carried into effect, reference will now be made, by way of example only, to the following drawings in which.

DETAILED DESCRIPTION

The following sets forth specific details, such as particular embodiments or examples for purposes of explanation and not limitation. It will be appreciated by one skilled in the art that other examples may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers. Nodes that communicate using the air interface also have suitable radio communications circuitry. Moreover, where appropriate the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analogue) circuitry including but not limited to application specific integrated circuit(s) (ASIC) and/or field programmable gate array(s) (FPGA(s)), and (where appropriate) state machines capable of performing such functions.

Some embodiments disclosed herein relate to the processing of Internet-of-Things (IoT) communications. Such communications may be delay tolerant. That is, processing (e.g. baseband processing) of such communications may have little or no negative impact. For example, delay tolerant communications may include communications whose processing (e.g. baseband processing) can be performed at a longer time following transmission than other communications. Therefore, for example, delay tolerant IoT communications may have a high latency constraint or requirement, or a longer latency constraint or requirement than other communications. Delay tolerant IoT communications may be, for example, those that carry Machine Type Communication (MTC) data, Massive Machine Type Communication (MMTC) data, Internet of Things (IoT) data, EC-GSM-IoT data, eMTC data, Narrowband Internet of Things (NB-IoT) data or narrowband radio access technology (narrowband RAT) data. Delay tolerant communications may therefore be communications from devices that are associated with these types of data, e.g. IoT-type devices. Examples of IoT-type devices include or are included in smart meters (e.g. water, gas or electricity meters), smart city devices (e.g. streetlights, parking systems, waste management systems), smart buildings (e.g. alarm systems, Heating, ventilation, and air conditioning (HVAC), access control systems, security systems), agriculture/environment systems (e.g. land/environment monitoring, pollution monitoring, animal tracking systems) and consumer devices (e.g. white goods). In some examples, delay tolerant communications are those communications that may not be performed in real time. For example, voice or video communications between participants may be real-time communications that are not delay-tolerant, as a delay to the communications may have a detrimental effect of the quality of the communication experience for the participants. On the other hand, communications that do not expect an immediate action or response, such as for example reporting from smart meters, may be considered as delay tolerant, as for example a delay in such communications may have little or no effect. In some examples, a delay may comprise for example a delay or an additional delay (in addition to a delay through a communications network) of one second, ten seconds, or any other delay.

Other communications from other devices may comprise, for example, delay sensitive or "regular" traffic from User Equipment (UE) devices and the like, and may relate to for example voice calls, video calls, internet access and the like. A UE may refer to any wireless device which transmits data which is not delay tolerant. In some examples, the UE may be a mobile phone or may be in Machine Type Communication which is not delay tolerant. Delay sensitive communications may comprise any communications where a delay may have a detrimental effect, e.g. reduction in quality of experience in a communication system, loss of connection or synchronization between network nodes, reduction or loss of control of machinery in a manufacturing system, or any other detrimental effect.

Embodiments described herein may use the delay tolerant nature of delay tolerant IoT communications. For example, embodiments described herein may enable centralized processing of delay tolerant IoT communications. Whilst sending delay tolerant communications to a centralized processing unit (e.g. network node) for processing (e.g. baseband processing) may cause a delay, this may be acceptable to delay tolerant communications, whilst not being acceptable to delay sensitive communications. For example, the additional delay may not cause the processing of delay tolerant IoT communications to be delayed beyond a delay or latency constraint. The centralized processing of delay tolerant communications may allow for efficient implementation of cellular telecommunications networks. Additionally or alternatively, the delay tolerant nature of delay tolerant IoT communications may be allow for transport of such communications to one or more processing nodes using residual bandwidth of transport networks between nodes (e.g. Radio Equipment Controllers). That is, for example, any underutilization of the full bandwidth of transport networks can be used to transport delay tolerant communications to a processing node for processing. As any underutilization of the transport network may be irregular, the delay tolerance of delay tolerant communications can be considered as a degree of freedom to allocate transport resources for transport of these communications to a processing node.

Using a centralized processing node (e.g. for baseband processing of delay-tolerant IoT communications such as NB-IoT communications) for a large area may be advantageous. Conventional mobile traffic, for example carried by a CPRI interface from a RE to a REC, has much more tight latency constraints with respect to NB-IoT traffic. For example, the conventional mobile traffic may have a much shorter permitted time between transmission and processing (e.g. baseband processing) and hence has a shorter latency constraint. Other types of communication other than delay tolerant IoT communications may be delay sensitive, and therefore any delay in sending these communications to a remote node for baseband processing may be undesirable or unacceptable. The delay in sending these communications remotely may be, for example, in addition to delay in transferring communications to a processing node for processing. That is, for example, where a network includes a Cloud RAN (CRAN) with multiple Radio Equipment (RE) and a Radio Equipment Controller (REC), the delay added by transferring communications from a RE to the REC may be acceptable for all communications, but the additional delay incurred by transferring communications from the REC to another node for baseband processing may be acceptable only for delay tolerant communications.

The underlying transport network, for example an optical network, that carries traffic between e.g. a RE and a REC may in some embodiments support fronthaul transmission of both NB-IoT and conventional mobile traffic towards the respective processing nodes, and may make efficient use of bandwidth to support the sporadic and small NB-IoT flows. Granularities of transport pipes may be orders of magnitude higher than a typical NB-IoT data transmission flow. This may cause a severe inefficiency in the usage of transport bandwidth, e.g. allocating a 1 Gbps pipe to a NB-IoT transmission that may be up to hundreds of Kbps. This problem may be exacerbated when the number of IoT devices in an area is large. For example, there may be up to 1 million devices or more per square kilometre. Allocating pipes in the transport network may lead to inefficiencies or even saturation of at least a part of the transport network. Local processing could partially avoid saturation of transport network resources, at the price of losing the benefit of a centralized or common processing node for processing delay tolerant communications. However, embodiments disclosed herein seek to address the problem of transport network usage by delay tolerant, low-bandwidth communications.

Figure 1:
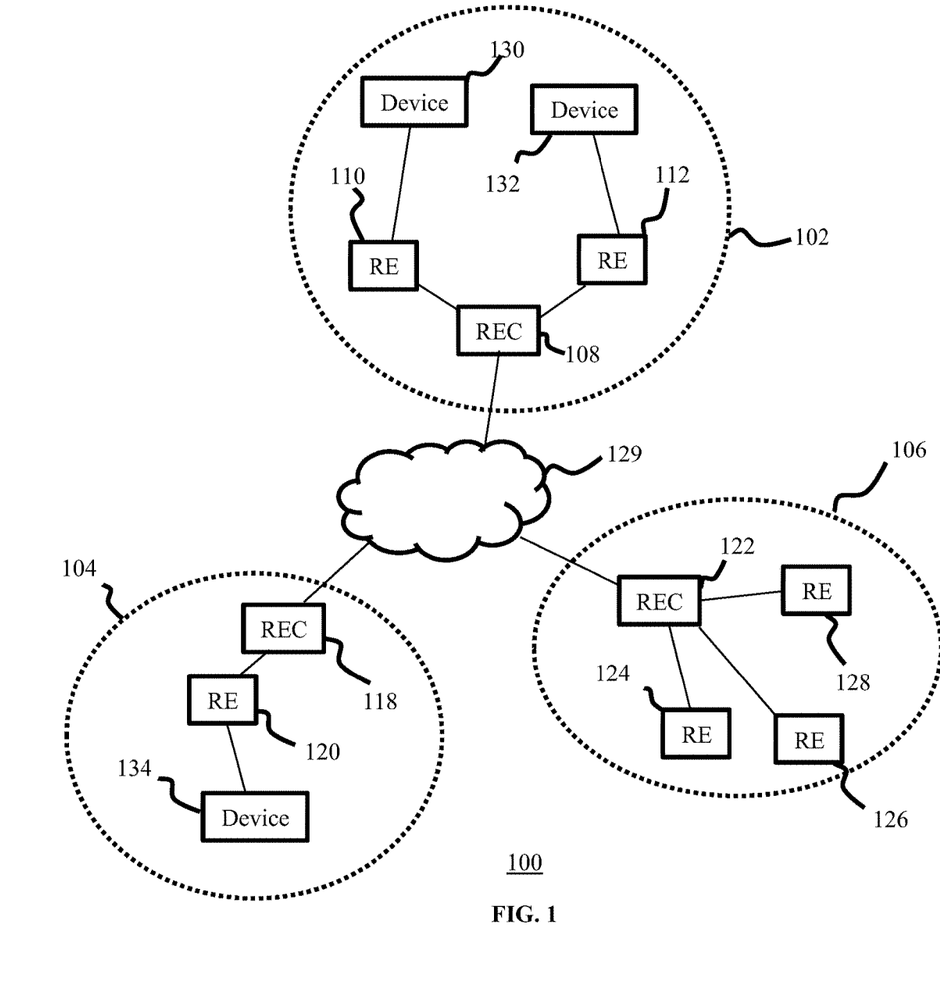
FIG. 1 is a schematic illustration of an example of a network.

FIG. 1 shows an example of a network 100. The network comprises three CRANs (Cloud Radio Access Networks) 102, 104 and 106. Each CRAN comprises one or more Radio Equipment (RE), such as Remote Radio Units (RRUs), and a Radio Equipment Controller (REC), such as a Baseband Unit (BBU). For example, CRAN 102 comprises REC 108 and RE 110 and 112; CRAN 104 comprises REC 118 and RE 120; and CRAN 106 comprises REC 122 and RE 124, 126 and 128.

In a CRAN, each RE may communicate with the REC via a transport network or link such as for example an optical fiber network or link. The REC in each CRAN may perform baseband processing on data received from the REs. For example, the transport network or links may be used to transmit digitised radio data, e.g. by implementing a Common Public Radio Interface (CPRI) between a REC and its associated REs. The CPRI may, for example, provide data received by a RE from one or more devices to its associated REC in the CRAN in the form of in-phase and quadrature (IQ) samples. The REC may then perform baseband processing on the samples. The REC may also provide data to be transmitted by its associated REs in a similar manner.

The RECs 108, 118 and 122 may communicate with each other and/or a core network via a network 129 such as a backhaul network, which in some examples may be at least partially an optical network. The network 100 is an illustrative example and in other networks, there may be one or more CRANs, each with one or more Radio Equipment. Although each RE is shown in FIG. 1 as connected directly to its respective REC, REs in a CRAN can be daisy chained, e.g. a RE may be connected to a REC via another RE.

FIG. 1 also shows a first device 130 that is in communication with a first RE 110 in CRAN 102 (for example, the device 130 is in a cellular coverage area provided by RE 110). Also shown are a second device 132 in communication with RE 112 in CRAN 102, and a third device 134 in communication with RE 120 in CRAN 104. This is an illustrative example and in other examples there may be any number of devices communicating with each RE.

Each of the devices 130, 132 and 134 may transmit and/or receive data to/from the RE with which it is in communication. One or more of the devices may for example transmit data to its respective RE that is delay tolerant, e.g. is transmitted by the device according to the NB-IoT standard. Each of the devices may also transmit other communications such as voice, video or data traffic. Each device may transmit one or both of delay tolerant IoT traffic and other traffic.

Transmissions received by each RE in the network 100 are forwarded to the associated REC, i.e. the REC in the same CRAN. For example, the REs 110 and 112 forward received transmissions to REC 108 in CRAN 102. Each REC may send at least some delay tolerant communications to a centralized processing node for processing, and may also process other communications. In an example, device 130 is a UE (i.e. a wireless device operating using data which is not delay tolerant), and device 132 operating using data which is delay tolerant, e.g. a NB-IoT-capable device such as a smart meter. The REC 108 may process (e.g. perform baseband processing on) communications from device 130, and may forward at least some communications from device 132 to another node for processing (e.g. baseband processing).

In some examples, the node to which delay tolerant communications are forwarded is a REC in another CRAN.

For example, in the network 100, RECs 108 and 118 may forward at least some delay tolerant communications such as NB-IoT traffic to REC 122 for processing. The RECs 108, 118 and 122 may also process other communications locally. Thus, delay tolerant data is baseband processed in a node or a CRAN different to the non-delay tolerant data.

Figure 2:
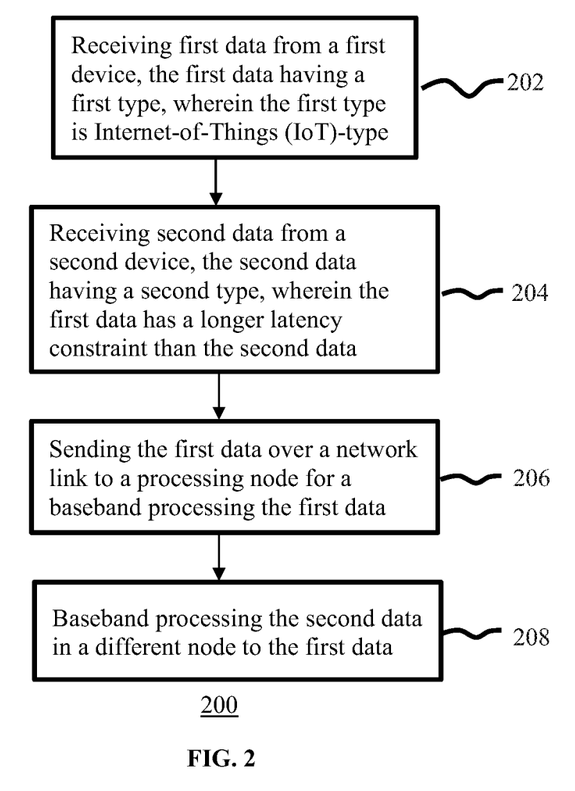
FIG. 2 is a flow chart of an example of a method of processing communications.

FIG. 2 shows a method 200 of processing communications. The method may be implemented by a node in a network, such as for example a Radio Equipment Controller (REC), though the method may be implemented by any suitable node. Step 202 of the method 200 comprises receiving first data from a first device, the first data having a first type, wherein the first type is Internet-of-Things (IoT)-type. For example, data received from the first device may comprise delay tolerant IoT transmissions such as NB-IoT transmissions. References to IoT may alternatively refer to MTC. Step 204 of the method 200 comprises receiving second data from a second device, the second data having a second type. The second type may be different to the first type. For example, the second type may be delay-sensitive data, non-IoT data, conventional mobile traffic, and/or any other type of data. The first data has a longer latency constraint than the second data. That is, for example, the maximum permissible time between transmission and baseband processing of the first data is longer than the maximum permissible time between transmission and baseband processing of the second data. The second data may comprise, for example, mobile telecommunications such as voice calls, video calls, internet access and the like.

Step 206 of the method 200 comprises sending the first data over a network link to a processing node for baseband processing the first data. The processing node may be for example another REC or any suitable node in a network. The processing node may receive data from multiple REs in a network, and hence may perform centralized baseband processing of data such as delay tolerant IoT data (e.g. MTC, MMTC, IoT and NB-IoT data).

Step 208 of the method 200 comprises baseband processing the second data in a different node to the first data. This may involve processing the second data "locally", e.g. in a node performing the method 200. In other examples, this may involve sending the data to a node other than the processing node. The delay in sending the second data to the node for processing may be less than the delay in sending the first data to its processing node.

In some examples, the method 200 carried out by a node in a network such as a RE may include buffering a plurality of data transmissions from the first device, and sending the plurality of data transmissions using a transport resource on the network link. Therefore, for example, transmissions or communications received at a REC from one or more REs, where the transmissions or communications are delay tolerant (e.g. NB-IoT transmissions), are diverted into a buffer before being forwarded to a processing node. Delay-tolerant IoT transmissions may also be forwarded in a manner so as to make efficient use of a network link or links between the node carrying out the method and the processing node. For example, the plurality of data transmissions may be sent to the processing node when a total size of the plurality of data transmissions in a buffer exceeds a threshold proportion of a bandwidth of the transport resource. In an example, if a transport resource (e.g. amount of bandwidth) is available for sending transmissions to the processing node, the transmissions may be sent when an amount in the buffer exceeds 80% of the available bandwidth. This may make efficient use of transport resources over a network link, particularly where the network link may also be used for other purposes.

Details identifying transport resources on the network link may be received at the node (e.g. RE) from a transport resource provider. Referring to FIG. 1, the transport resource provider may be associated with the network 100 or the network 129 (e.g. backhaul network).

In an alternative scenario, or in addition to the above sending the plurality of data transmissions to the processing node when a total size of the plurality of data transmissions in the buffer exceeds a threshold proportion of a bandwidth of the transport resource, the first data may be stored in the buffer and forwarded to the processing node when a difference between an expiry time of at least some of the first data and a current time is less than a delay time for transmissions over the network link plus a tolerance time. The expiry time may be the time before which the data is expected to be processed, e.g. at least baseband processed, and the tolerance time is an additional period of time to ensure that he data may be forwarded to the processing node and processed before the expiry time. This way, the first data can be held in a buffer and forwarded collectively for efficient use of the network link, but the expiry time may be respected to ensure that none of the first data is likely to expire before processing. The delay time may be the delays of one or more links between the node forwarding the first data and the processing node, including the processing delay at any intermediate nodes. The tolerance time ensure that the first data is processed in time, though in some cases the tolerance time may be zero (e.g. it is not considered). The expiry time may in some examples be the time from transmission plus the delay tolerance or latency constraint. In some cases, when first data is forwarded collectively to the processing node, portions of the first data with an earliest expiry time may be sent first.

In some examples, processing of data may comprise at least one of: OSI Layer 1 processing (e.g. of samples of a signal received from a device) to construct or recover bits transmitted from a device; OSI Layer 2 processing to construct frames from the bits; and OSI Layer 3 processing to construct packets (e.g. IP packets) from the bits or frames. Non-delay tolerant data such as mobile telecommunications data from UEs and the like may be processed in this manner at a node such as a RE without being forwarded to a processing node. Such data can therefore for example be processed without any delays incurred in forwarding the data to a remote node for processing. Delay tolerant data received at a node such as a REC may be forwarded unchanged or repackaged by the REC without any of the above processing. The resulting bits, frames or packets may then be forwarded to the processing node for further processing.

In some examples, the network link may comprise or encapsulate a Common Public Radio Interface (CPRI). That is, CPRI may be implemented or available over the network link. In some cases, for example, CPRI data (e.g. CPRI frames) may be encapsulated and forwarded or tunnelled over the network link according to another interface or protocol. In some examples, where data is sent from a RE to a REC over a CPRI interface, CPRI data (e.g. CPRI frames) corresponding to delay tolerant traffic may be forwarded unchanged to the processing node.

A node in the network, such as for example in each CRAN 102, 104 and 106, for example the REC in each CRAN, may determine which received transmissions are delay tolerant (e.g. IoT or NB-IoT transmissions). For example, in some embodiments, a device may transmit one type of communications (e.g. delay tolerant communications or non-delay tolerant communications; IoT communications or other types of communications), and the type of communication transmitted by each device is known to the REC. In some examples, the network (e.g. the REC) may allocate a time slot and/or frequencies to each device for transmissions, and therefore the network (e.g. REC) can determine which received transmissions are delay tolerant from the time slot and/or frequencies in which they were received. In some embodiments, the time slot and/or frequencies may be scheduling information.

Figure 3:
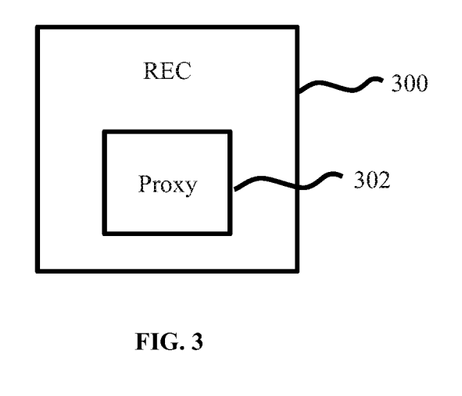
FIG. 3 is a schematic illustration of an example of a Radio Equipment Controller.

FIG. 3 shows an example of a Radio Equipment Controller (REC) 300, for example a REC 108, 118 or 122 shown in FIG. 1. The REC 300 includes a proxy component 302. The proxy component 302 is configured to send first data, (i.e. data of a first type) which is received by the REC 300, to a processing node over a network link for processing the first data. The first data may have an IoT-type (e.g. the first data may be delay tolerant data). Data received at the REC may be received, for example, from one or more REs and may be received from respective devices. Thus, the REC and/or proxy 400 may be considered to identify and separate data of the first type from data of the second type, such that the first and second data types may be processed (e.g. baseband processed) at different nodes. As such, the REC and/or proxy are configured to separate the processing node based on the latency constraint of the type of data and/or a type of device (e.g. IoT or non-IoT device). The first type of data is processed at a processing node which is remote to the REC 300 including the proxy component.

Figure 4:
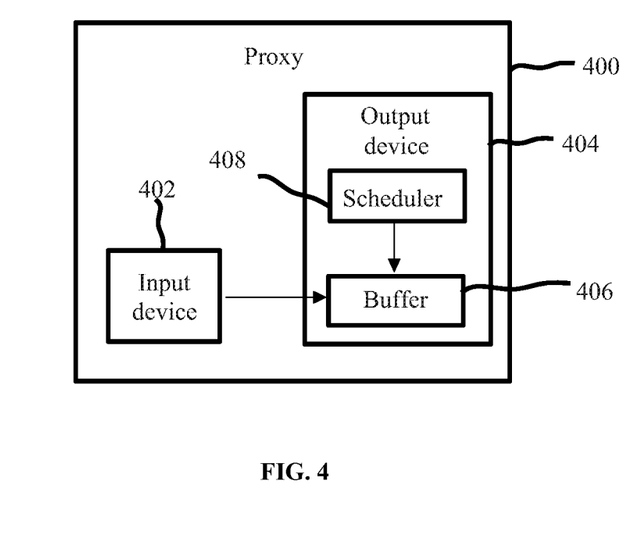
FIG. 4 is a schematic illustration of another example of a Radio Equipment Controller.

FIG. 4 shows an example of functional elements of a proxy 400, which may be the proxy component 302 shown in FIG. 3. The proxy 400 comprises an input device 402 and output device 404. The input device 402 receives first data (e.g. delay tolerant IoT data) and provides the first data to the output device 404. The output device 404 comprises a buffer 406 for buffering the first data, and a scheduler 408 for scheduling transmission of the first data in the buffer 406 over a network link to a processing node for baseband processing.

In some examples, the input device 402 and/or the output device 404 are receive a system clock that can be used to schedule incoming or outgoing transmissions respectively. The system clock may be synchronized to an external signal, such as for example a network clock or network time reference.

In some examples, the scheduler 408 may schedule transmission of the first data based on availability of transport resources on a network. For example, the scheduler 408 may schedule or otherwise cause the output device 404 to transmit data from the buffer 406 where a transport resource is available, and also in some examples where the transport resource, e.g. an optical channel, can be utilized by the data in the buffer 406 at least a threshold proportion (e.g. at least 80% of the resource will be utilized). Thus, the scheduler 408 may be considered to schedule the forwarding of the first type of data based on the transport network over which the first type of data will be sent to be processed (i.e. based on transport resource availability and/or based on a requirement to fill at least a predetermined proportion of the transport resource with the first type of data).

In some examples, the proxy 400 transmits the first type of data to a baseband processing node in another part of the network, e.g. another part of the radio access network, for baseband processing. The baseband processing node may belong to a different CRAN 104,106 than the RE receiving the first type of data. The baseband processing node may be a common baseband processing node for a plurality of CRANs, e.g. common to a plurality of RECs. Thus, each CRAN may have a separate baseband processing node for the second type of data (which is delay sensitive data) and a common baseband processing node for the first type of data (which is not delay sensitive data). In some examples, the CRAN may be considered as a plurality of REs and one or more connected baseband processing units (BBUs, also known as RECs or Digital Units) in a radio access network. The baseband processing node for the first type of data is connected to the RE via the proxy 400. In some examples, the first type of data is transmitted from the proxy 400 to the common baseband processing node for the first type of data over a transport network. As such, the common baseband processing node is considered as geographically remote from the proxy 400, and also the connected RE, i.e. not co-located. In some examples, the common baseband processing node for the first type of data may be co-located with a baseband processing unit for the second type of data for a different CRAN.

Figure 5:
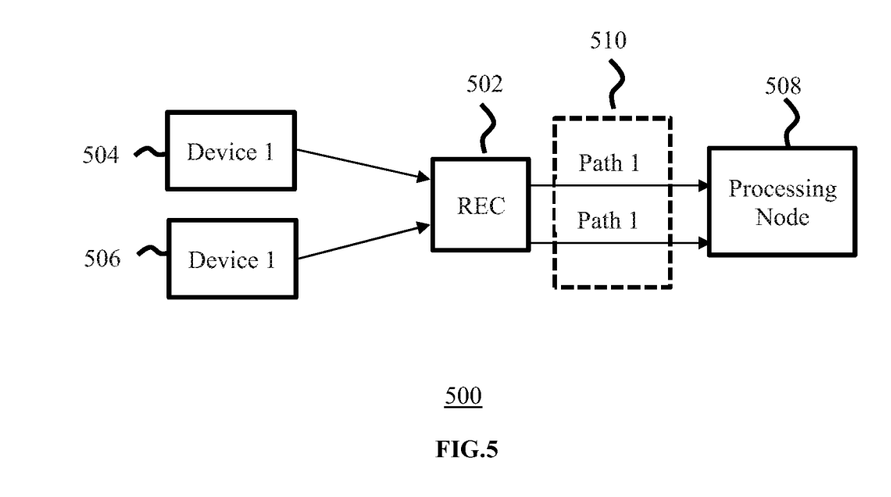
FIG. 5 is a schematic illustration of an example of a part of a network.

In some examples, there may be multiple paths between a node (e.g. a REC) and a processing node for processing the delay tolerant IoT communications, each path having respective transport delay and available bandwidth. FIG. 5 shows an example of a part of a network 500 that includes a REC 502 that receives delay tolerant traffic from a first device 504 and a second device 506. The REC 502 forwards the traffic to a processing node 508, or baseband processing node, over a transport network 510. The transport network 510 is shown having two available paths, path 1 and path 2, between the REC 502 and the processing node 508.

Each path, path 1 and path 2, is characterized by an available bandwidth Bx and a path delay Dx (i.e. the time between transmission of traffic from the REC 502 and reception of the traffic at the processing node 508), where x is 1 or 2. The available bandwidth can be, for example, a 1 Gbps ODU container in a 10 Gbps wavelength. Path delay may be due to link delays plus processing delays in intermediate packet nodes, if present. Example transmissions from the first device 504 can be considered in an example scenario to have a processing deadline at time T1, and respectively from the second device 506 at time T2

For the first device 504, the REC 502 may consider (T1-D1) as deadline for transmission using path 1 or (T1-D2) using path 2. The deadlines may also in some examples take into account an additional time e.g. a tolerance time. By considering the bandwidth requirements and time constraints of the delay tolerant transmissions from the devices 504 and 506 and by considering the transport options (e.g. paths) with respective bandwidths and delays, the REC 502 can determine suitable transmission opportunities for transmitting traffic from each device 504 and 506 to the processing node 508 whilst efficiently exploiting the available transport bandwidth.

For example, the REC 502 may fill the available bandwidths on a path as much as possible by storing delay tolerant traffic in a buffer within the relevant processing deadline. The following two examples may be used to determine when to transmit traffic from a particular device to the processing node:

1. Lower Time First (LTF): The time budget of a specific flow (or the lower time budget in a group of IoT flows), such as delay tolerant traffic from a particular device, is comparable with the transport latency budget of conventional radio flows. In this case, as soon the bandwidth resource is available, the REC 502 may transmit the flow. The REC 502 may choose to first transmit the flow that is closest to expiration.

2. Bandwidth Fit First (BFF): The time budget before traffic in a flow must be processed may be large enough to significantly delay the processing. In this case, I may be more convenient to store all the flows and send first the ones that suit the available bandwidth. The REC 502 may assume that a new transport resource (e.g. bandwidth on a path in the transport network 510) will be available before any of the stored traffic will expire. The REC 502 may choose to first transmit the flow that best suits the available bandwidth, e.g. the flow with the most stored traffic.

Figure 6:
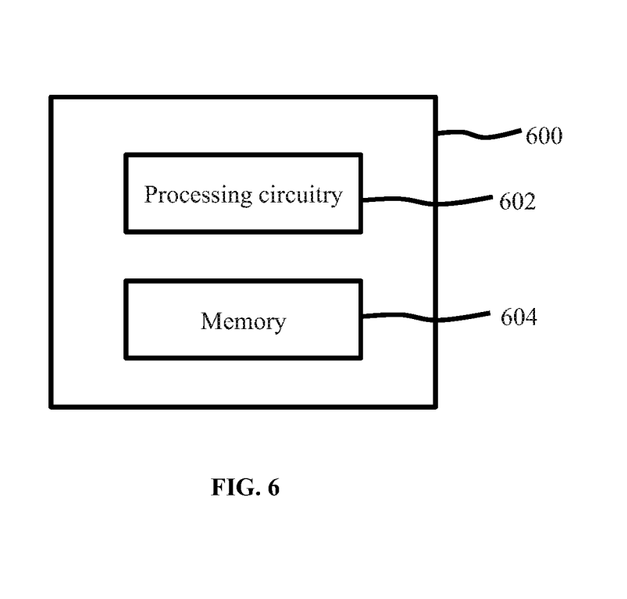
FIG. 6 is a schematic illustration of an example of apparatus for processing communications.

FIG. 6 shows an example of apparatus 600 according to embodiments of the disclosure. The apparatus 600 may be for example an apparatus for processing communications. The apparatus 600 may be configured to perform the method of FIG. 2 or any other example. The apparatus 600 comprises processing circuitry 602 (e.g. a processor) and a memory 604 in communication with the processing circuitry 602. The memory 604 contains instructions executable by the processor 602. In one embodiment, the memory 604 contains instructions executable by the processor 602 such that the apparatus is operable to is operable receive first data from a first device, the first data having a first type, wherein the first type is Internet-of-Things (IoT)-type, receive second data from a second device, the second data having a second type, wherein the first data has a longer latency constraint than the second data, and send the first data over a network link to a processing node for baseband processing the first data in a different node to the second data.

Figure 7:
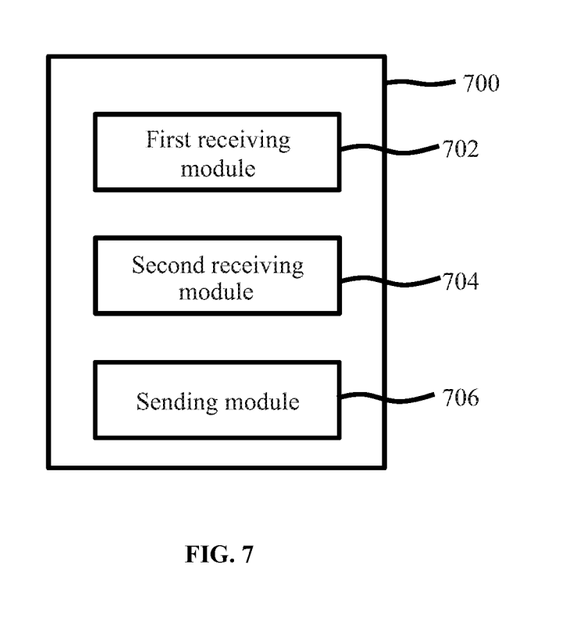
FIG. 7 is a schematic illustration of an example of apparatus for processing communications.

FIG. 7 shows an example of an apparatus 700, for example for processing communications. The apparatus comprises a first receiving module 702 configured to receive first data from a first device, the first data having a first type, wherein the first type is Internet-of-Things (IoT)-type, and a second receiving module 704 configured to receive second data from a second device, the second data having a second type, wherein the first data type has a longer latency constraint than the second data type. The apparatus 700 also comprises a sending module 706 configured to send the first data over a network link to a processing node for baseband processing the first data in a different node to the second data.

It should be noted that the above-mentioned examples illustrate rather than limit the invention, and that those skilled in the art will be able to design many alternative examples without departing from the scope of the appended statements. The word "comprising" does not exclude the presence of elements or steps other than those listed in a claim, "a" or "an" does not exclude a plurality, and a single processor or other unit may fulfil the functions of several units recited in the statements below. Where the terms, "first", "second" etc. are used they are to be understood merely as labels for the convenient identification of a particular feature. In particular, they are not to be interpreted as describing the first or the second feature of a plurality of such features (i.e. the first or second of such features to occur in time or space) unless explicitly stated otherwise. Steps in the methods disclosed herein may be carried out in any order unless expressly otherwise stated. Any reference signs in the statements shall not be construed so as to limit their scope.

The invention claimed is:

1. A method in a network node, the method comprising:
   receiving first data from a first device, the first data having a first type, wherein the first type is Internet-of-Things (IoT)-type;
   receiving second data from a second device, the second data having a second type, wherein the first data has a longer latency constraint than the second data;
   sending the first data over a network link to a processing node for baseband processing the first data, wherein sending the first data comprises:
      buffering a plurality of data transmissions from the first device; and
      sending the plurality of data transmissions using a transport resource on the network link; and
   wherein sending the plurality of data transmissions comprises sending based on an available bandwidth of the transport resource; and
   baseband processing the second data in a different node than the first data,
   wherein sending the plurality of data transmissions comprises sending the plurality of data transmissions when a total size of the plurality of data transmissions in a buffer exceeds a threshold proportion of a bandwidth of the transport resource.

2. The method of claim 1, wherein sending the first data over a network link to a processing node for baseband processing the first data comprises sending the first data to a first Cloud Radio Access Network (CRAN) for baseband processing the first data, and baseband processing the second data comprises baseband processing the second data in a second Cloud Radio Access Network (CRAN).

3. The method of claim 1, wherein sending the first data comprises sending the first data when a difference between an expiry time of at least some of the first data and a current time is less than a delay time for transmissions over the network link plus a tolerance time.

4. The method of claim 1, wherein the first type is a narrowband radio access technology type.

5. The method of claim 1, wherein the network link comprises a Common Public Radio Interface (CPRI).

6. The method of claim 1, wherein the second data comprises delay sensitive data.

7. The method of claim 1, wherein the first data and the second data are received from at least one Radio Equipment (RE).

8. The method of claim 1, further comprising identifying the first data from scheduling information for transmissions from the first device.

9. The method of claim 1, wherein the network node comprises a Radio Equipment Controller (REC).

10. Apparatus for processing communications, the apparatus comprising a processor and a memory, the memory containing instructions executable by the processor such that the apparatus is operable to:
    receive first data from a first device, the first data having a first type, wherein the first type is Internet-of-Things (IoT)-type;
    receive second data from a second device, the second data having a second type, wherein the first data has a longer latency constraint than the second data;
    send the first data over a network link to a processing node for baseband processing the first data, wherein the memory contains instructions executable by the processor such that the apparatus is operable to send the first data by:
       buffering a plurality of data transmissions from the first device; and
       sending the plurality of data transmissions using a transport resource on the network link; and
    wherein the memory contains instructions executable by the processor such that the apparatus is operable to send the plurality of data transmissions by sending based on an available bandwidth of the transport resource; and baseband process the second data or send the second data to a different node than the first data for baseband processing,
wherein the memory contains instructions executable by the processor such that the apparatus is operable to send the plurality of data transmissions by sending the plurality of data transmissions when a total size of the plurality of data transmissions in a buffer exceeds a threshold proportion of a bandwidth of the transport resource.

11. The apparatus of claim 10, wherein the memory contains instructions executable by the processor such that the apparatus is operable to send the first data over a network link to a processing node for baseband processing the first data by sending the first data to a first Cloud Radio Access Network (CRAN) for baseband processing the first data, and baseband processing the second data comprises baseband processing the second data in a second Cloud Radio Access Network (CRAN).

12. The apparatus of claim 10,
wherein the memory contains instructions executable by the processor such that the apparatus is operable to send the first data by sending the first data when a difference between an expiry time of at least some of the first data and a current time is less than a delay time for transmissions over the network link plus a tolerance time.

13. The apparatus of claim 10, wherein the first type is a narrowband radio access technology type.

14. The apparatus of claim 10, wherein the network link comprises a Common Public Radio Interface (CPRI).

15. The apparatus of claim 10, wherein the second data comprises delay sensitive data.

16. The apparatus of claim 10, wherein the first data and the second data are received from at least one Radio Equipment (RE).

17. The apparatus of claim 10, wherein the memory contains instructions executable by the processor such that the apparatus is operable to identify the first data from scheduling information for transmissions from the first device.

18. The apparatus of claim 10, wherein the apparatus comprises a Radio Equipment Controller (REC).

* * * * *